United States Patent [19]
Schroeder et al.

[11] Patent Number: 5,964,490
[45] Date of Patent: Oct. 12, 1999

[54] METHOD AND APPARATUS FOR ATTACHING COMPOSITE PLASTIC AUTOMOBILE BODY TO STEEL AUTOMOBILE FRAME

[75] Inventors: Del C. Schroeder, Bloomfield Hills; Donald E. Jay, Troy; David J. Kowall, Hartland, all of Mich.

[73] Assignee: Chrysler Corporation, Auburn Hills, Mich.

[21] Appl. No.: 08/877,935

[22] Filed: Jun. 18, 1997

Related U.S. Application Data

[63] Continuation of application No. 08/545,971, Oct. 20, 1995, abandoned.

[51] Int. Cl.⁶ ................................................ B62D 24/00
[52] U.S. Cl. ..................... 296/35.1; 296/901; 403/267; 156/92; 156/291
[58] Field of Search ........................ 296/35.1, 29, 187, 296/203, 901, 198; 403/265, 267; 156/91, 92, 291

[56] References Cited

U.S. PATENT DOCUMENTS

| | | | |
|---|---|---|---|
| 4,438,971 | 3/1984 | Zaydel et al. | 296/901 X |
| 4,679,845 | 7/1987 | Detampel et al. | 296/901 X |
| 4,957,326 | 9/1990 | Chiba et al. | 296/901 X |
| 4,978,164 | 12/1990 | Nakamura et al. | 296/197 |
| 5,098,765 | 3/1992 | Bien | 296/191 X |
| 5,228,742 | 7/1993 | Johnson et al. | 296/191 |

FOREIGN PATENT DOCUMENTS

| | | | |
|---|---|---|---|
| 134382 | 6/1988 | Japan | 296/901 |
| 41986 | 2/1990 | Japan | 296/901 |
| 404254266 | 9/1992 | Japan | 296/198 |
| 1237615 | 6/1971 | United Kingdom | 296/901 |

*Primary Examiner*—Dennis H. Pedder

[57] ABSTRACT

A molded plastic automobile body is bonded to a steel frame by depositing an adhesive layer between the body and frame in a circular pattern, to facilitate thermal expansion of the body relative to the frame. To prevent the body from peeling away from the frame, anti-peeling bolts further connect the body to the frame. To diffuse over a large area the downward force of the bolt heads on the plastic body, thereby reducing scalloping of the plastic body, spring washers having large surface areas are sandwiched between the bolts and the body.

7 Claims, 3 Drawing Sheets

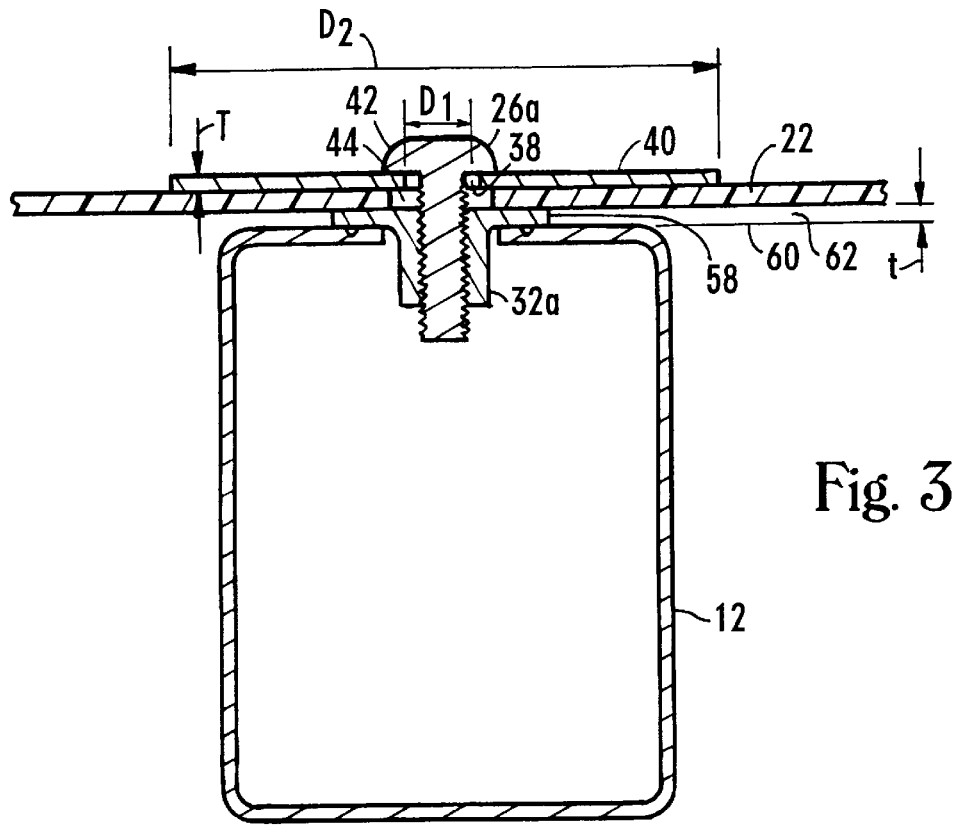
Fig. 3
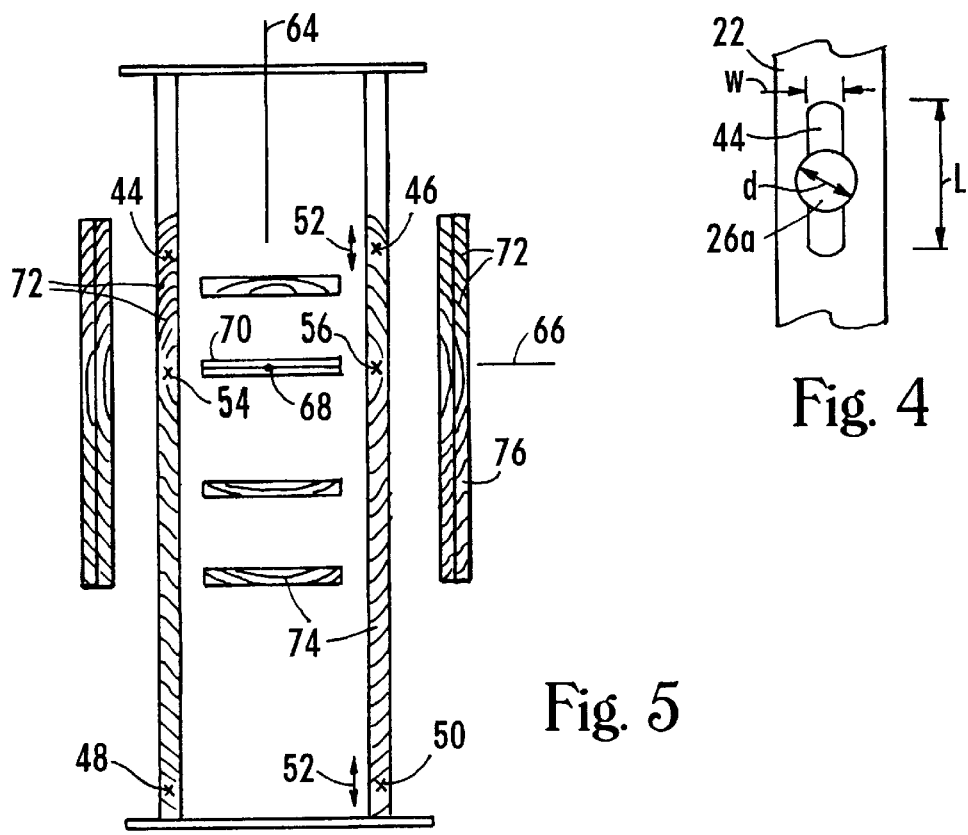
Fig. 4
Fig. 5

METHOD AND APPARATUS FOR ATTACHING COMPOSITE PLASTIC AUTOMOBILE BODY TO STEEL AUTOMOBILE FRAME

CROSS-REFERENCE TO RELATED APPLICATION

This application is a continuation of application Ser. No. 08/545,971, filed Oct. 20, 1995, now abandoned, titled "Method and Apparatus for Attaching Composite Plastic Automobile Body to Steel Automobile Frame," by the same inventors as in the present application.

This application is related to co-pending U.S. patent application Ser. No. 08/540,297, for an invention entitled "Motor Vehicle Body", incorporated herein by reference.

FIELD OF INVENTION

The present invention relates generally to automobiles, and more particularly to lightweight automobile bodies.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that a useful, low-cost, lightweight automobile can be provided which has a molded plastic body consisting essentially of a molded left half side bonded to a molded right half side. After molding, the body is attached to a steel frame which supports the body and drive components. It will readily be appreciated that a molded plastic body is both lightweight, compared to metal automobile bodies, and relatively inexpensive.

As further recognized by the present invention, however, it is not sufficient to simply bolt a plastic body to a steel frame, in contrast to present steel-bodied automobiles. More specifically, in contrast to present steel automobile bodies, mechanical expansions and contractions of plastic automobile bodies that are attributable to ambient temperature changes (referred to herein as "thermal expansion") occur at a rate that is faster than the thermal expansion rate for steel. Consequently, simply bolting portions of the body to the frame (and thereby constraining movement of the bolted portions) could result in cracking of the bolted portions as the body thermally expands or contracts. Thus, the means for attaching the body to the frame must account for this difference between the steel and plastic thermal expansion rates, while nevertheless effecting a firm attachment of the body to the frame.

Moreover, the present invention recognizes that a plastic automobile body should be relatively stiff. Accordingly, as recognized herein the means for attaching a molded plastic body to a steel frame ideally adds stiffness to the automobile structure. Additionally, the present invention recognizes that the means for attaching a molded plastic body to a steel frame also ideally reduces the likelihood of the plastic body peeling away from the portion of the frame to which it is attached. As still further recognized by the present invention, the means for attaching a plastic body to a steel frame is preferably relatively inexpensive, yet effective.

Accordingly, it is an object of the present invention to provide a means for attaching a plastic automobile body to a steel automobile frame which accounts for variations between the thermal expansion rate of the body and the thermal expansion rate of the frame. Another object of the present invention is to provide a means for firmly attaching a plastic automobile body to a steel automobile frame that incorporates a relatively simple design. Still another object of the present invention is to provide a means for firmly attaching a plastic automobile body to a steel automobile frame that adds stiffness to the automobile structure. Yet another object of the present invention is to provide a means for firmly attaching a plastic automobile body to a steel automobile frame that is easy to use and cost-effective.

SUMMARY OF THE INVENTION

An automobile has a plastic molded body including a molded left side shell and a molded right side shell. A steel frame is positioned beneath the body, and a layer of adhesive is deposited between the frame and body to attach the body to the frame.

In accordance with the preferred embodiment, the adhesive establishes a plurality of arcuate patterns, with the arcuate patterns preferably being arcs of concentric circles. As disclosed in detail herein, the frame defines a longitudinal centerline, and the center of the concentric circles is located on the centerline.

To substantially prevent peeling of the body away from the frame, a plurality of bolts is engaged with the body and frame. In addition to the longitudinal centerline, the frame also defines a transverse axis which is perpendicular to the longitudinal centerline and which passes through the center of the concentric circles. Further, the body is formed with expansion bolt holes that are distanced from the transverse axis when the body is attached to the frame for receiving respective bolts therethrough. In accordance with principles discussed herein, the expansion bolt holes are elongated in the dimension of the longitudinal centerline to permit the body to thermally expand and contract relative to the frame.

Advantageously, a plurality of spacers are disposed between the frame and body for establishing a uniformly-thick adhesive gap between the frame and body, and the adhesive substantially fills the gap. In one presently preferred embodiment, the thickness of the gap is approximately three millimeters (3 mm).

In another aspect, a method for attaching a plastic molded automobile body to a steel frame includes depositing a body adhesive layer on the body in an arcuate pattern, and depositing a frame adhesive layer on the frame in an arcuate pattern. The body is then urged toward the frame to bond the body to the frame.

In yet another aspect of the present invention, a system for bonding a plastic automobile body to a steel frame includes a body adhesive layer deposited on the body in an arcuate pattern. The system further includes a frame adhesive layer deposited on the frame in the arcuate pattern.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a cross-sectional view of the body and frame, as would be seen along the line 3—3 in FIG. 2 with the body attached to the frame;

FIG. 4 is a top plan view of an expansion bolt hole of the present invention;

FIG. 5 is a schematic top plan view of the frame and body, showing the novel adhesive deposition pattern of the present invention, with the body shown distanced from the frame and with portions of the body omitted for illustration purposes;

DETAILED DESCRIPTION OF THE PREFERRED EMBODIMENT

Figure 1:
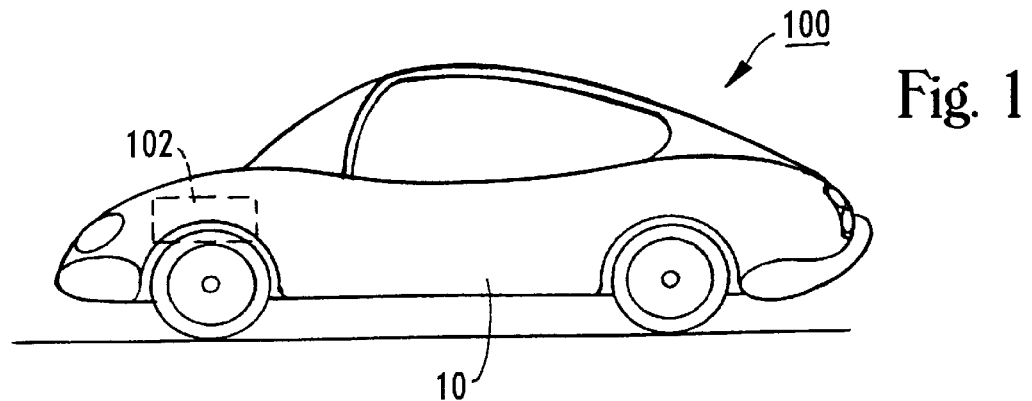
FIG. 1 is a perspective view of the composite plastic automobile body of the present invention shown attached to a steel frame.
Figure 2:
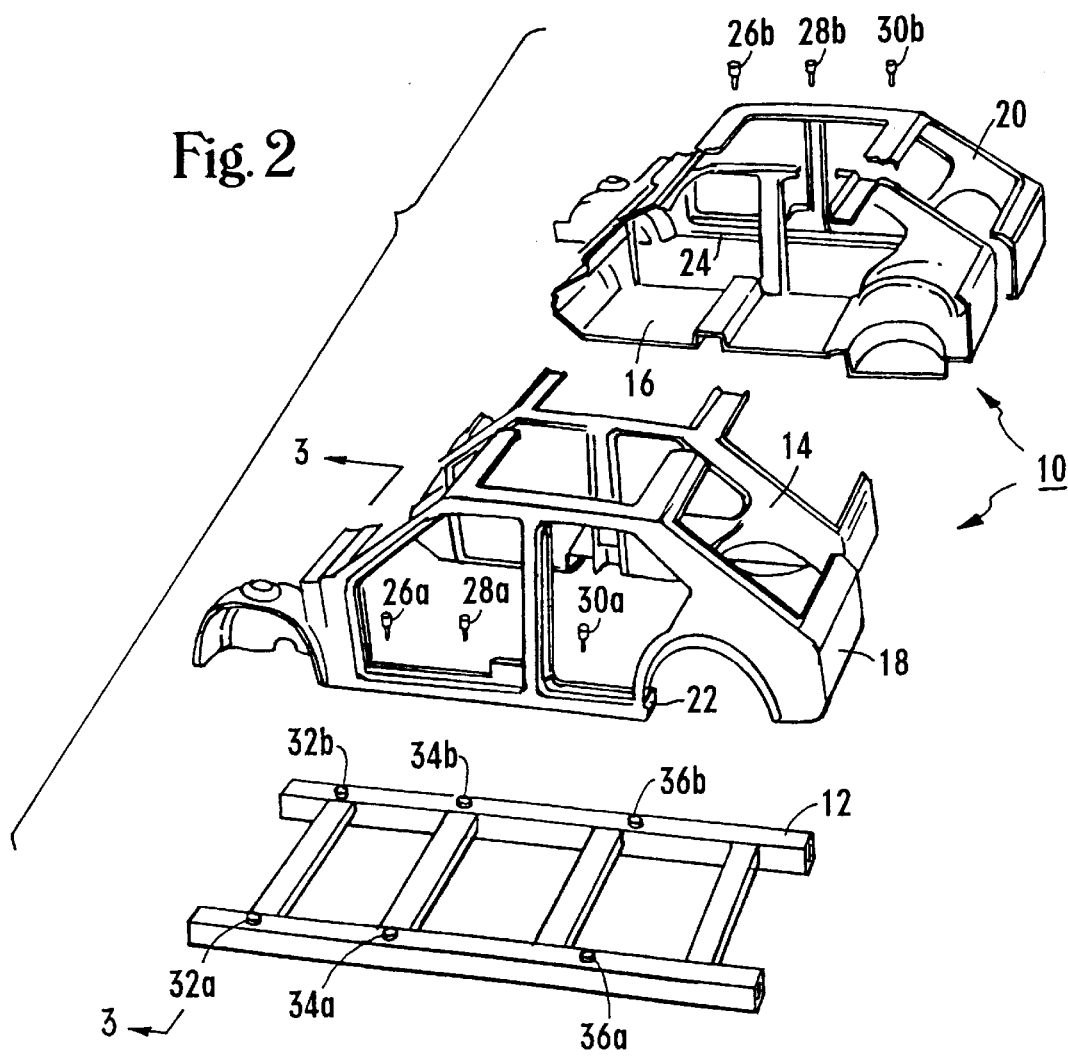
FIG. 2 is an exploded perspective view of the body and frame with anti-peeling bolts.

Referring initially to FIGS. 1 and 2, an automobile body 10 is shown attached to a steel automobile frame 12 for inclusion in an automobile, generally designated 100, having a power train 102 operably engaged therewith. Preferably, the automobile body 10 is made of a plastic composite material by injection molding. In a particularly preferred embodiment, the automobile body 10 is made of fiberglass-reinforced polyethylene (PET) plastic, such as the material that is available from Hoechst-Celanese under the trade name Celstran PET-15 having 15% fiberglass by weight.

As fully disclosed in the above-referenced U.S. patent application and shown best in FIG. 2, in the presently preferred embodiment the body 10 is made of four molded pieces. Specifically, the body 10 is made of unitarily molded inner left and right panels 14, 16 which are bonded together. The inner right panel 16 is formed with a horizontally-oriented floor pan 17 which establishes the floor of the automobile 100. It is to be understood, however, that the floor pan 17 can be made separately from the inner right panel 16, e.g., the floor pan 17 can be a steel plate that is attached to the frame 12 and bonded to the panels 14, 16 of the body 10.

Furthermore, the body 10 is made of unitarily molded outer left and right panels 18, 20 which are bonded to their respective inner panels 14, 16. As intended by the present invention, the inner and outer left panels 14, 18 establish a relatively stiff molded left shell, while the inner and outer right panels 16, 20 establish a relatively stiff molded right shell.

Each of the outer panels 16, 20 is formed with a respective lower engagement lip 22, 24, and as more fully disclosed below each lip 22, 24 is adhesively bonded to the frame 12. In addition to bonding the body 10 to the frame 12, the adhesive also reduces the transmission of unwanted noise from the frame 12 to the body 10. Additionally, a plurality of, preferably six, steel anti-peeling bolts 26a,b, 28a,b, 30a,b hold the body 10 next to the frame 12 to prevent the body 10 from peeling away from the frame 12.

More particularly, forward left and right threaded bolts 26a,b respectively extend through the left and right engagement lips 22, 24 of the body 10 and respectively engage complementarily-threaded forward left and right engagement nuts 32a,b that are welded to or formed integrally with the frame 12. Also, center left and right bolts 28a,b respectively engage center left and right engagement nuts 34a,b, and rear left and right bolts 30a,b respectively engage rear left and right engagement nuts 36a,b. Each bolt 26–30 includes a respective threaded shaft having a diameter of about five-sixteenths of an inch ($\frac{5}{16}$").

FIG. 3 shows the preferred combination of structure for bolting the body 10 to the frame 12, using the forward left bolt 26a as an example. As shown, the bolt 26a extends through a circular aperture 38 that is formed in a disc-shaped flat spring washer 40. The aperture 38 is just large enough to receive the threaded shank of the bolt 26a therethrough, i.e., in the preferred embodiment the aperture 38 has a diameter $D_1$ that is just larger than $\frac{5}{16}$". Thus, the bolt 26a is formed with a dome-shaped head 42, with the diameter of the head 42 being greater than the diameter of the aperture 38 of the washer, to prevent the head 42 from passing through the aperture 38. It is to be understood that each bolt 26–30 is engaged with a respective washer that is in all essential respects identically configured to the washer 40 shown in FIG. 3.

As intended by the present invention, the washer 40 has a diameter "$D_2$" and a thickness "T", and the diameter "$D_2$" is large compared to the thickness "T", for purposes to be shortly disclosed. More particularly, in contrast to existing automotive washers, the diameter "$D_2$" of the washer 40 is at least about fifteen (15) times greater than the thickness "T" of the washer 40. Accordingly, as intended by the present invention a spring washer has a relatively large diameter and, hence, large surface area, compared to its thickness.

As further shown in FIG. 3, the left lip 22 of the body 10 is formed with a forward left expansion bolt hole 44, and the forward left bolt 26a extends through the bolt hole 44 and is threadably engaged with the forward left engagement nut 32a of the frame 12. Referring briefly to FIG. 4, the forward left bolt hole 44 defines a transverse width "W" which is less than the diameter "d" of the head of the bolt 26a but larger than the shank of the bolt 26a. Thereby, the bolt 26a is prevented from passing through the bolt hole 44, but can move somewhat side-to-side in the bolt hole 44. Additionally, the forward left bolt hole 44 defines a longitudinal length "L" which is larger than the width "W" of the bolt hole 44. In the preferred embodiment, the length "L" is about three quarters of an inch ($\frac{3}{4}$").

Accordingly, the skilled artisan will appreciate that the purpose of the forward left expansion bolt hole 44 is to provide a means for engaging the forward left bolt 26a (and, hence, the frame 12) with the body 10, while permitting longitudinal movement of the body 10 with respect to the frame 12. Thereby, thermal expansion of the body 10 at a rate different than the thermal expansion rate of the frame 12 is facilitated. Also, the width "W" of the bolt hole 44 permits some transverse movement of the body 10 with respect to the frame 12. Because the body 10 and frame 12 are elongated in the longitudinal dimension, however, thermal expansion of the body 10 causes less such transverse movement than longitudinal movement.

It is to be understood that the body 10 is formed with a forward right bolt hole 46, rear left bolt hole 48, and rear right bolt hole 50, shown schematically in FIG. 5, for respectively receiving the forward right bolt 26, rear left bolt 30a, and rear right bolt 30b therethrough. As intended by the present invention, the forward right bolt hole 46, rear left bolt hole 48, and rear right bolt hole 50 are all configured substantially identically to the forward left bolt hole 44 to permit thermally-induced longitudinal movement of the body 10 relative the frame 12, as indicated by the arrows 52 in FIG. 5. To this end, the forward and rear bolts 26a,b, 30a,b, are tightened to a relatively low torque which is sufficient to permit thermally-induced longitudinal movement of the body 10 relative the frame 12 past the forward and rear bolts 26a,b, 30a,b.

On the other hand, center left and right bolt holes 54, 56 (shown schematically in FIG. 5) are formed in the lips 22, 24 of the body 10 for receiving the center left and right bolts 28a,b respectively therethrough, and the center holes 54, 56 are not elongated. Rather, the center bolt holes 54, 56 are round and have diameters marginally larger than the diameters of the threaded shanks of their respective bolts 28. Further, the center bolts 28a,b, are tightened to a relatively high torque to substantially prevent relative motion of the body 10 with respect to the frame 12 past the center bolts 28a,b.

Accordingly, those skilled in the art will recognize that the present invention contemplates longitudinal thermal expansion of the body 10 relative the frame 12 to propagate substantially from (i.e., be referenced to) the center bolt holes 54, 56. For this reason, the elongated forward and rear expansion bolt holes 44–50 are distanced from the axis defined by the center bolt holes 54, 56. Moreover, those skilled in the art will now recognize that the spring washers of the present invention, owing to their relatively large surface areas, diffuse the downward clamping force of the heads of the bolts 26–30 over a relatively large area of the plastic body 10. Thereby, so-called "scalloping", i.e., deformation of, the body 10 that can be caused by steel objects being excessively tightened against plastic is reduced.

Referring back to FIG. 3, the internally threaded forward left nut 32a is formed integrally with or welded to the frame 12 for threadably engaging the forward left bolt 26a. When the nut 32a is formed integrally with the frame 12, the nut 32a is essentially a boss.

In any case, the nut 32a defines a rigid spacer 58 that is sandwiched between the body 10 and frame 12. As shown, the spacer 58 defines a thickness "t", and in the preferred embodiment the thickness "t" of the spacer 58 is approximately three millimeters (3 mm). It can be appreciated in cross-reference to FIGS. 2 and 3 that the spacers defined by the nuts 32a,b, 34a,b, 36a,b establish an adhesive gap 60 between the body 10 and frame 12 having a uniform thickness equal to the thickness "t" of the spacers.

An adhesive 62 preferably fills the gap 60 to thereby bond the body 10 to the frame 12. Thus, the adhesive 62 has a uniform thickness equal to the thickness "t" of the spacers. In the presently preferred embodiment, the adhesive 62 is a polymeric adhesive characterized by a capability to be mechanically stretched 50%–200% before it mechanically fails. In the presently preferred embodiment, the adhesive is a type 8000/6660 adhesive made by Ashland Chemical Co. of Dublin, Ohio. Preferably, before depositing the adhesive 62 on the frame 12 as discussed below, the frame 12 is primed to promote adhesion. In the presently preferred embodiment, type 603132 steel primer is applied to the frame 12 prior to depositing the adhesive 62 to the frame 12.

Turning to FIG. 5, the novel adhesive deposition pattern of the present invention for facilitating thermal expansion of the body 10 vis-a-vis the frame 12 without causing mechanical failure of the adhesive 62 can be appreciated. As shown, the frame 12 defines a longitudinal centerline 64 and a transverse axis 66 which is perpendicular to the longitudinal centerline 64. A pattern center 68 is established at the intersection of the transverse axis 66 and longitudinal centerline 64.

As shown, the center left and right bolt holes 54, 56 substantially lie on the transverse axis 66. Preferably, a first transverse beam 70 of the frame 12 also lies on the transverse axis 66. In the embodiment shown in FIG. 5, the transverse axis 66 is intermediate the ends of the body 10, but may not necessarily be midway between the ends of the body 10, depending on the configuration of the particular frame 12.

The adhesive 62 shown in FIG. 3, depicted by the arcs 72 in FIG. 5, is deposited onto both the frame 12 as a frame adhesive layer 74 and onto the body 10 as a body adhesive layer 76, and both layers 74, 76 are deposited in an arcuate pattern. Preferably, the layers 74, 76 are respectively rolled onto the frame 12 and body 10. The temperature of the adhesive during deposition advantageously is maintained in the middle of the expected ambient temperature range in which the automobile body 10 is expected to be used.

After deposition, the body 10 is engaged with the frame 12, and the adhesive 62 (FIG. 3) substantially fills the gap 60 that is established by the spacers of the present invention. Excess adhesive is urged out of the gap 60 as the bolts 26–30 are tightened.

Locking mechanisms may be used to prevent disengagement of the bolts 26–30 from the nuts 32–36. For example, a bonding agent may be deposited on the threads of the bolts 26–30 prior to engaging the bolts 26–30 with the nuts 32–36, to bond the bolts to the nuts. Or, mechanical locking devices well-known in the art may be used in lieu of or in addition to the bonding agent.

In the preferred embodiment shown, the arcs 72 of adhesive are arcs of concentric circles having a common center at the pattern center 68. Stated differently, the arcs 72 of adhesive are deposited substantially along the lines of propagation of thermal expansion of the body 10 relative to the frame 12.

With the above-disclosed combination of structure in mind, thermal expansion of the body 10 relative to the frame 12 is facilitated. More particularly, by configuring the bolt holes 44–56 and by tightening the bolts 26–30 as disclosed, thermal expansion of the body 10 relative to the frame 12 is referenced to the pattern center 68 and is facilitated as shown by the arrows 52 in FIG. 5. Still further, depositing the adhesive 62 in the arcuate pattern shown facilitates such thermal expansion without mechanically breaking the adhesive bond between the body 10 and frame 12. Moreover, establishing a gap 60 as appropriate to establish a uniform, optimum thickness of adhesive 62 promotes effective bonding while facilitating thermal expansion.

Figure 6:
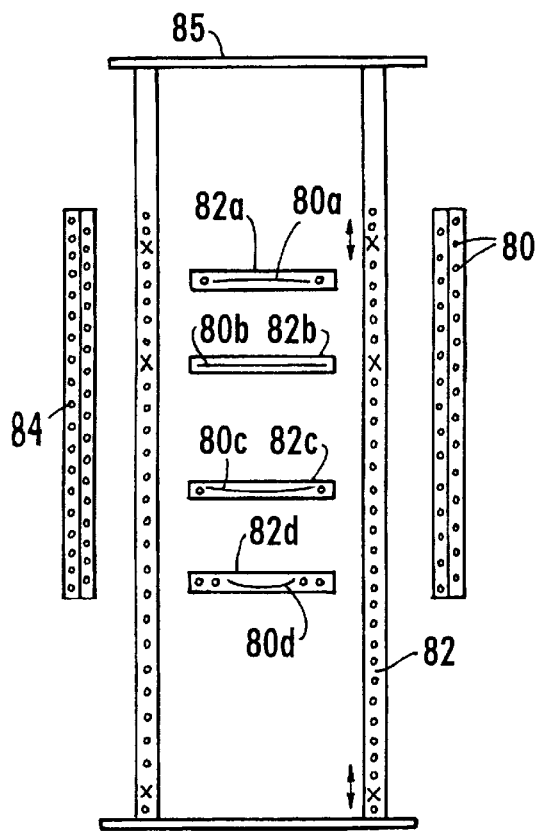
FIG. 6 is a schematic top plan view of the frame and body, showing an alternate adhesive deposition pattern, with the body shown distanced from the frame and with portions of the body omitted for illustration purposes.

FIG. 6 shows an alternate pattern in which an adhesive substance 80 can be deposited onto a frame 82 and a body 84. It is to be understood that except for the particular pattern shown in FIG. 6, the adhesive 80, frame 82, and body 84 are substantially identical in composition, function, and configuration to the adhesive 62, frame 12, and body 10 hereinbefore disclosed.

As shown in FIG. 6, the adhesive 80 is deposited onto both the frame 82 and the body 84 in a linear pattern of adhesive drops. Specifically, adhesive 80 is deposited onto each side panel of the body 84 in a single line of drops, and onto each side of the frame 82 in a single line of drops.

Furthermore, adhesive 80 is deposited in a continuous arcuate line 80a on a forward transverse frame beam 82a, with single drops of adhesive being deposited adjacent each end of the arcuate line 80a. The arcuate line 80a is convex relative to the front 85 of the frame 82.

On the other hand, adhesive 80 is deposited in a continuous straight line 80b on a centerline frame beam 82b. In contrast, adhesive 80 is deposited in a continuous arcuate line 80c on an intermediate aft transverse frame beam 82c, with single drops of adhesive being deposited adjacent each end of the arcuate line 80c. Likewise, adhesive 80 is deposited in a continuous arcuate line 80d on an aftermost aft transverse frame beam 82d, with two drops of adhesive being deposited adjacent each end of the arcuate line 80d. The arcuate lines 80c,d are concave relative to the front 85 of the frame 82.

Figure 7:
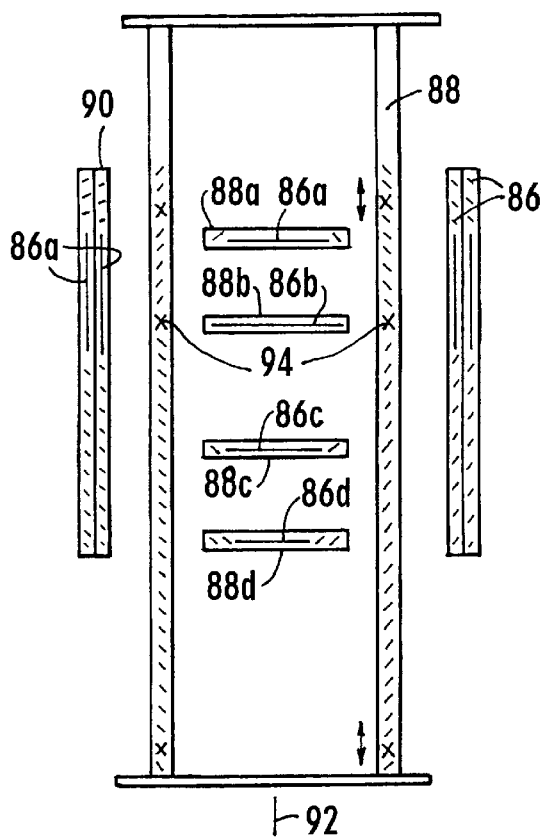
FIG. 7 is a schematic top plan view of the frame and body, showing another alternate adhesive deposition pattern, with the body shown distanced from the frame and with portions of the body omitted for illustration purposes.

FIG. 7 shows yet an alternate pattern in which an adhesive substance 86 can be deposited onto a frame 88 and a body 90. It is to be understood that except for the particular pattern shown in FIG. 7, the adhesive 86, frame 88, and body 90 are substantially identical in composition, function, and configuration to the adhesive 62, frame 12, and body 10 hereinbefore disclosed.

As shown in FIG. 7, the adhesive 86 is deposited onto both the frame 88 and the body 90 in a series of hashed lines which are essentially one-half of a zig-zag deposition pattern. Specifically, adhesive 86 is deposited onto each side panel of the body 90 in a single row of hashed lines that are separated from and generally parallel to their immediately adjacent neighboring lines of adhesive 86. Likewise, adhesive 86 is deposited onto each side of the frame 88 in a single row of hashed lines that are separated from and generally parallel to their immediately adjacent neighboring lines of adhesive 86. As shown, each hashed line of adhesive 86 is oriented at an oblique angle, preferably 45°, relative to the longitudinal axis 92 of the frame 88. The only exception is that continuous lines 86a of adhesive 86 are deposited on each side panel of the body 90 parallel to the long axis 92, and the continuous lines 86a extend fore and aft of center hold-down bolts 94.

In contrast, adhesive 86 is deposited on forward, centerline, intermediate aft and aftermost aft transverse frame beams 88a, 88b, 88c, 88d in respective straight, transversely-oriented forward, centerline, intermediate aft and aftermost aft lines 86a, 86b, 86c, 86d. Single hash lines of adhesive 86 are deposited adjacent each end of the forward and intermediate aft adhesive lines 86a, 86c, whereas double hash lines of adhesive 86 are deposited adjacent each end of the aftermost aft adhesive line 86.

Figure 8:
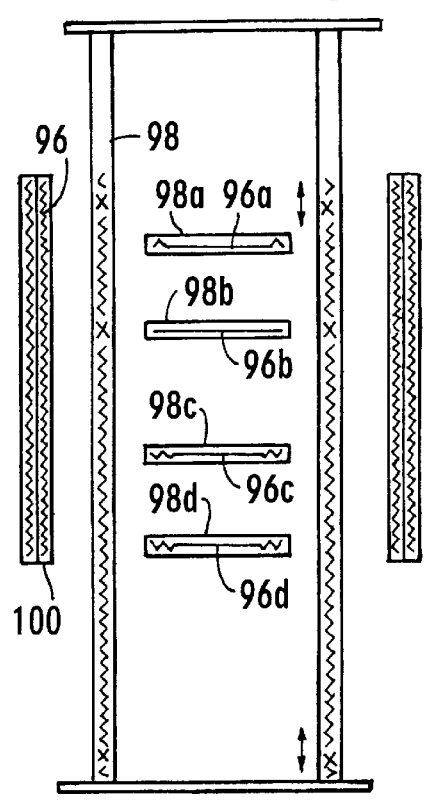
FIG. 8 is a schematic top plan view of the frame and body, showing yet another alternate adhesive deposition pattern, with the body shown distanced from the frame and with portions of the body omitted for illustration purposes.

FIG. 8 shows still an alternate pattern in which an adhesive substance 96 can be deposited onto a frame 98 and a body 100. It is to be understood that except for the particular pattern shown in FIG. 8, the adhesive 96, frame 98, and body 100 are substantially identical in composition, function, and configuration to the adhesive 62, frame 12, and body 10 hereinbefore disclosed.

As shown in FIG. 8, the adhesive 96 is deposited onto both the frame 98 and the body 100 in a full zig-zag deposition pattern. Specifically, adhesive 96 is deposited onto each side panel of the body 100 in a single zig-zag pattern. Likewise, adhesive 96 is deposited onto each side of the frame 98 in a single zig-zag pattern.

In contrast, adhesive 96 is deposited on forward, centerline, intermediate aft and aftermost aft transverse frame beams 98a, 98b, 98c, 98d in respective straight, transversely-oriented forward, centerline, intermediate aft and aftermost aft lines 96a, 96b, 96c, 96d. Short zig-zag lines of adhesive 96 of incrementally longer length from forward frame beam 98a to aftermost aft frame beam 98d are deposited adjacent each end of the forward, intermediate aft, and aftermost aft adhesive lines 96a, 96c, 96d.

While the particular METHOD AND APPARATUS FOR ATTACHING COMPOSITE PLASTIC AUTOMOBILE BODY TO STEEL AUTOMOBILE FRAME as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. An automobile, comprising:
   a plastic molded body having a molded left side shell and a molded right side shell;
   a steel frame positioned beneath the body; and
   a layer of adhesive deposited between the frame and body to attach the body to the frame, the adhesive establishing a plurality of arcuate patterns,
   wherein the arcuate patterns are the arcs of concentric circles defining a center, the frame defines a longitudinal centerline, and the center is located on the centerline.

2. The automobile of claim 1, further comprising a plurality of bolts engaged with the body and frame to substantially prevent peeling of the body away from the frame.

3. The automobile of claim 2, wherein the frame defines a transverse axis perpendicular to the longitudinal centerline and passing through the center of the concentric circles, and the body is formed with expansion bolt holes distanced from the transverse axis when the body is attached to the frame for receiving respective bolts therethrough, the expansion bolt holes being elongated in the dimension of the longitudinal centerline to permit the body to thermally expand and contract relative to the frame.

4. A method for attaching a plastic molded automobile body to a steel frame, comprising the steps of:
   (a) depositing a body adhesive layer on the body in an arcuate pattern;
   (b) depositing a frame adhesive layer on the frame in an arcuate pattern;
   (c) urging the body toward the frame to bond the body to the frame; and
   (d) bolting the body to the frame, wherein the arcuate patterns are arcs of concentric circles defining a center, the frame defines a longitudinal centerline, and the center is located on the centerline.

5. A system for bonding a plastic automobile body to a steel frame, comprising:
   a body adhesive layer deposited on the body in an arcuate pattern;
   a frame adhesive layer deposited on the frame in the arcuate pattern;
   wherein the arcuate pattern is arcs of concentric circles defining a center, the frame defines a longitudinal centerline, and the center is located on the centerline when the body is bonded to the frame.

6. The system of claim 5, further comprising a plurality of bolts engaged with the body and frame to substantially prevent peeling of the body away from the frame.

7. The system of claim 6, wherein the frame defines a transverse axis perpendicular to the longitudinal centerline and passing through the center of the concentric circles, and the body is formed with expansion bolt holes distanced from the transverse axis when the body is attached to the frame for receiving a respective one of the plurality of bolts therethrough, the expansion bolt holes being elongated in the dimension of the longitudinal centerline to permit the body to thermally expand and contract relative to the frame.

* * * * *